United States Patent [19]

Toboni et al.

[11] Patent Number: 5,340,122
[45] Date of Patent: Aug. 23, 1994

[54] DIFFERENTIALLY-PUMPED FERROFLUIDIC SEAL

[75] Inventors: James C. Toboni, Bedford; Thomas J. Black, Jr., Merrimack, both of N.H.

[73] Assignee: Ferrofluidics Corporation, Nashua, N.H.

[21] Appl. No.: 901,884

[22] Filed: Jun. 22, 1992

[51] Int. Cl.$^5$ .............................................. F16J 15/40
[52] U.S. Cl. ........................................ 277/59; 277/80; 378/93; 378/101; 378/123; 378/125
[58] Field of Search .................... 174/51; 378/93, 101, 378/121, 123, 131, 132, 133, 144, 125; 277/80, 3, 59, 71, 79

[56] References Cited

U.S. PATENT DOCUMENTS

| | | | |
|---|---|---|---|
| 4,357,023 | 11/1982 | Yamamura | 277/80 X |
| 4,360,734 | 11/1982 | Dietz et al. | 378/93 |
| 4,407,518 | 10/1983 | Moskowitz et al. | 277/80 X |
| 4,577,340 | 3/1986 | Carlson et al. | 277/80 X |
| 4,772,032 | 9/1988 | Raj et al. | 277/80 |
| 4,852,140 | 7/1989 | Dax | 378/125 X |
| 4,890,850 | 1/1990 | Raj et al. | 277/80 |
| 5,007,513 | 4/1991 | Carlson | 277/80 X |
| 5,077,781 | 12/1991 | Iversen | 378/132 X |

FOREIGN PATENT DOCUMENTS 236971 10/1986 Japan ..................... 277/80

OTHER PUBLICATIONS

Rev. Sci. Instrum.: "A simple rotating anode X-ray generator"; vol. 46, No. 1, Jan. 1975.

Primary Examiner—William A. Cuchlinski, Jr.
Assistant Examiner—Scott W. Cummings
Attorney, Agent, or Firm—Cesari and McKenna

[57] ABSTRACT

A ferrofluidic seal arrangement for sealing a high-speed rotary shaft which passes between an environment at atmospheric or high pressure and an environment at high-vacuum is provided, which is especially useful in a high-speed rotating anode apparatus for generating x-rays in a CAT Scan apparatus or the like. A differentially-pumped region between a multi-stage ferrofluidic seal and a single-stage seal insures that no seal bursting into the high-vacuum region occurs. Bearings supporting the shaft are arranged in a mechanically-stable arrangement but are isolated from the high-vacuum environment. Thus, neither the high-vacuum environment nor the differentially-pumped region need be continually mechanically pumped, and a relatively light-weight apparatus results. The apparatus is electrically grounded by transferring the charge on the anode through the high-speed shaft out of the vacuum environment and to a slower-rotating shaft via an electrically conductive, flexible drive belt, the slower shaft rotating at a speed at which grounding by conventional means is feasible.

26 Claims, 6 Drawing Sheets

DIFFERENTIALLY-PUMPED FERROFLUIDIC SEAL

FIELD OF THE INVENTION

The present invention relates generally to ferrofluidic seals, and more specifically to a mechanically stable, multi-stage ferrofluidic seal apparatus for sealing a high-speed rotary shaft which passes from an environment at high vacuum to an environment at atmospheric pressure or high pressure, and to a method for grounding a high-speed rotary shaft.

BACKGROUND OF THE INVENTION

Computer assisted tomography (CAT Scan) is a method of medical diagnosis which utilizes x-rays, generated by firing an electron beam at an anode in a region of high vacuum. In this application it is necessary to generate a high density of x-rays for a relatively short period of time, rather than a lower density of x-rays for a longer period of time, as the former is better tolerated by humans. For this purpose, a high-power electron beam is advantageously utilized to bombard an anode, thus producing x-rays, but the process can result in heat and radiation-induced degradation of the metal anode. Thus, the anode is commonly mounted on a shaft which rotates extremely rapidly (6,000 to 12,000 revolutions per minute) so that a fresh anode surface is continually presented to the electron beam. As the anode surface rotates out of the beam, it is allowed to cool before being re-introduced into the beam, and anode degradation is avoided. Also, the x-ray-generating anode and supporting apparatus is generally violently accelerated back and forth across the top of the CAT Scan apparatus such that analysis from various required angles relative to the human body is carried out in a relatively short period of time. Low weight is thus desirable, and elimination of the necessity of continuous pumping to maintain high vacuum is advantageous. Anode-supporting shaft speeds of from 6,000 to 12,000 revolutions per minute (RPM) are ideally attainable for extended periods in this application, and mechanical stability of the shaft arrangement is thus extremely important.

Charge builds in the anode and in the shaft as the electron gun fires upon the anode, thus the shaft must be efficiently electrically grounded or arcing across shaft-support bearings will occur, ruining them over time. Conventional grounding inside a vacuum environment via, for example, mercury slip rings, carbon brushes, or gold foil brushes will result in particulate matter contaminating the vacuum, and at very high shaft rotation speeds (6,000–12,000 RPM) efficient grounding directly at the shaft becomes impossible in any region. In addition, conventional grounding near bearings can cause particulate matter to ruin the bearings.

Ferrofluidic seals have been utilized to provide a hermetic seal against gas and other contaminants in applications similar to that described above. Ferrofluidic seals have been utilized to prevent contaminants from reaching the disk area in computer magnetic disk storage units, for robotic actuators designed for use in ultra-pure vacuum processing of semiconductor wafers, and for pumps in refineries and chemical plants.

Ferrofluidic seals are normally installed to remain stationary about rotating shafts, but can be installed to seal a stationary shaft about which a hub rotates. The seals operate generally through employment of ferrofluid in a gap between the rotating shaft and stationary seal surfaces, and include an annular magnet for providing a desired magnetic flux path which retains and concentrates the ferrofluid in a seal-tight liquid O-ring in the gap. Ferrofluidic seals typically include a permanent annular ring magnet polarized axially, and a pair of magnetically-permeable annular pole pieces which sandwich the magnet, so that inner peripheral edges of the pole pieces extend toward and form a close, non-contacting gap with the exterior rotating shaft surface.

A single-stage ferrofluidic seal is created by placing a single annular pole piece in close proximity with and surrounding a shaft and in magnetic communication with a single magnet. Ferrofluid is retained in the pole piece/shaft gap by the magnetic field created by the magnet, which field follows a magnetic circuit containing the magnet, pole piece, the gap and the shaft. A second annular pole piece also in close proximity with the shaft and in magnetic communication with the other pole of the magnet can advantageously be employed in a single-stage seal. The gap between this second pole piece and the shaft generally contains no ferrofluid but enhances the magnetic flux across the gap within which ferrofluid is retained in the single-stage seal, thereby increasing the pressure capacity of the seal.

The ferrofluid seal can comprise more than one stage, that is, the seal may comprise a series of discrete pole pieces, or a pole piece (or pole pieces) may include a plurality of ridges and grooves, each ridge in close proximity with the shaft and defining an annular gap between the pole piece and the shaft. Ferrofluid is retained in several or all of these gaps to form a multi-stage ferrofluidic seal.

In another embodiment, a series of ridges and grooves is formed in the shaft, rather than in the pole piece or pole pieces, to define a multi-stage ferrofluidic seal in close proximity with an annular pole piece/magnet arrangement surrounding and in close proximity with the shaft.

The single pole piece, the series of pole pieces, the plurality of ridges in a pole piece (or pole pieces), or the ridge(s) in a shaft need not each have the same concentric radius, that is, the size of the resultant annular gap need not be equal from pole piece to pole piece or from ridge to ridge. In addition, the pole pieces and/or ridges need not be of the same width, nor of the same geometric design. Some of the pole pieces or ridges may be tapered to form an annular wedge-shaped gap having a sloping wall extending radially toward the axis of the shaft.

Variation of the width and/or taper of the pole pieces can result in selective ferrofluid retention in one or more annular gaps to create, selectively, one or more ferrofluid seals where originally each annular gap defined a seal. In addition, a gap created by a tapered pole piece will normally retain ferrofluid for a longer period of time, and tapered pole pieces or shafts prevent ferrofluid splashing at high shaft or hub rotation speeds. U.S. Pat. No. 4,357,021, issued Nov. 2, 1982, and U.S. Pat. No. 4,890,850, issued Jan. 2, 1992 and assigned to the same assignee of the present invention, describe the above-noted gap-selective retention of ferrofluid.

Conventional ferrofluid seals employed to seal high-vacuum systems, either under static or dynamic conditions, typically permit periodic bursts of air to pass the seal and to be introduced into the vacuum system. The periodicities of the bursts of air depend on the seal design and operating conditions. Furthermore, when the ferrofluid seal is employed for the first time after being in a static condition, a burst of air is typically introduced into the vacuum system. In a seal arrangement in which such bursting occurs, the high vacuum environment must be addressed by continuous pumping means, which adds weight to the overall apparatus.

A non-bursting, multiple-stage ferrofluid seal, designed to eliminate this problem, is described in U.S. Pat. No. 4,407,518, issued Oct. 4, 1983. In this invention, a first multi-stage annular seal is arranged in series with a second, single-stage annular seal along a shaft, the second seal being on the high-vacuum side of the first seal. The first multi-stage annular seal is designed and constructed to withstand the entire pressure drop between atmosphere (or high pressure) and high vacuum. An annular region between the first and second seals is maintained at a pressure between atmosphere (or high-pressure) and high vacuum, generally at a slight pressure, or a vacuum slightly poorer than the high vacuum. Thus, any bursting of the first, multi-stage seal resulting from the pressure differential between the atmosphere or high-pressure region and the intermediate region affects only the intermediate region, which is addressed by rough vacuum and is relatively undisturbed. The vacuum on either side of the second, single-stage seal is substantially identical, or at most, the pressure differential across the second seal is less than the pressure required to cause the second seal to burst. Thus, no bursting of the second seal occurs. The result is an improved, longer-lasting vacuum in the high-vacuum region.

However, the bearings supporting the shaft in the above-noted invention are arranged, for mechanical stability, in series with and surrounding the first and second seals and the intermediate vacuum region. Thus, at least one bearing is exposed to the high-vacuum region in this invention. This arrangement results in bearing outgassing into the high-vacuum region, contaminating and spoiling the high-vacuum region more quickly, and requiring continuous pumping.

One approach for isolating the high-vacuum region from bearing outgassing involves a "cantilevered" arrangement in which a multi-stage seal is arranged about a shaft with all shaft-supporting bearings in series with the seal but on the atmosphere or high-pressure side thereof. (Commercially available from Ferrofluidics Corporation, Inc., of Nashua, N.H.) For this arrangement, however, the bearings are spaced relatively close together rather than relatively at the ends of the shaft, and a shaft which is mechanically unstable at high rotation speeds results.

Additionally, the ferrofluid seal arrangements described above, when utilized to seal a shaft on which an anode or other electrical-charge-generating device is mounted, are subject to arcing across the seals when the shaft is not efficiently electrically grounded. Such arcing causes ferrofluid to "gel" and ruins the seals, and as noted above, grounding of a high speed rotary shaft is difficult.

Accordingly, a general purpose of the present invention is to provide a differentially-pumped, multiple-stage, mechanically-stable, non-bursting ferrofluid seal apparatus for sealing a rotary shaft which passes between an environment at a first pressure, which is generally atmospheric pressure or high pressure, and an environment at a second pressure, which is less than or equal to the first pressure and is generally a high vacuum. The apparatus is designed to be mechanically stable at very high shaft rotation speeds yet arranged such that bearing outgassing and ferrofluid seal bursting into the high-vacuum region is eliminated. The apparatus is further designed such that no continual mechanical vacuum pumping is required, and the shaft is electrically grounded remotely from high-speed rotation and remotely from vacuum and bearings. The above objects adapt the apparatus for the purpose of supporting a high-speed rotary anode, which anode is exposed to an electron beam for x-ray generation in a CAT Scan apparatus or the like.

SUMMARY OF THE INVENTION

The foregoing and other objects and advantages of the invention are achieved by providing a multiple-stage, non-bursting ferrofluid seal apparatus in which a first, multiple-stage seal surrounds a shaft rotatable at high speed and is designed and constructed to withstand the entire pressure drop between a first, high pressure environment and a second, high-vacuum environment. Bearings for supporting the shaft are provided on either side of the first multiple-stage seal and relatively at the ends of the shaft in a mechanically-stable arrangement, and a second, single-stage seal is arranged on the shaft in series with the first seal, the second seal isolating the high-vacuum environment from the bearings to prevent bearing outgassing thereinto and defining an enclosed, interstage volume between the first and second seals which is maintained at a pressure between the first pressure and the high vacuum (generally at a slight pressure, or a vacuum) slightly less than the high vacuum, such that bursting across the second seal and into the high-vacuum environment does not occur.

The shaft which is generally rotatable at a speed higher than that at which direct conventional grounding is feasible is advantageously grounded using a flexible, electrically conductive drive belt engaging the shaft and engaging a second shaft rotating at a speed slower than that at which the first shaft rotates and at a speed at which grounding by conventional means is feasible. Electrical grounding of the second shaft advantageously occurs in an environment remote from the high-vacuum environment and remote from bearings supporting the first shaft.

Other advantages, novel features and objects of the invention will become apparent from the following detailed description of the invention when considered in conjunction with the accompanying drawings.

DETAILED DESCRIPTION

Figure 1:
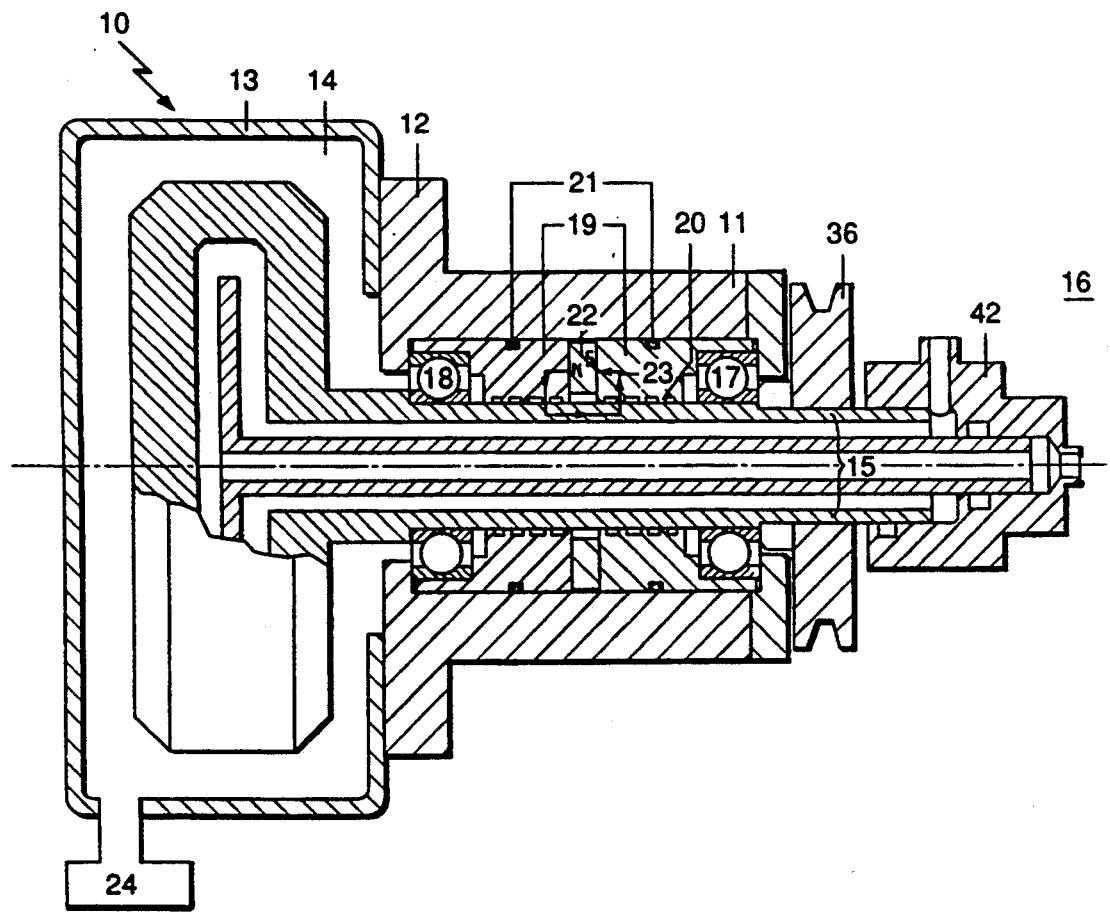
FIG. 1 is a cross-sectional view of a prior art ferrofluidic seal in operation about a rotating shaft. As a convenience for illustration, the prior art seal is shown as it would be used in a rotating x-ray anode application.

Referring to FIG. 1 a prior art ferrofluidic seal apparatus 10 is shown including a non-magnetically permeable housing 11 made of aluminum, stainless steel, or the like having an extended flange element 12 which adapts the housing to be secured to wall 13 of vacuum chamber 14. Magnetically-permeable hollow or solid shaft 15 extends through the housing 11 between atmospheric or high pressure environment 16 and vacuum chamber 14. Positioned inside and at either end of housing 11 are bearing elements 17 and 18 which support shaft 15.

The seal apparatus includes magnetically permeable pole-piece elements 19 including a series of ridges and grooves, the ridges being in close proximity to shaft 15 and defining annular gaps 20 between the shaft and the pole-piece ridges. Pole-piece elements 19 may be secured by static seals 21 to the interior wall surface of housing 11. The seal apparatus includes axially-polarized permanent magnet 22 directly adjacent to and in magnetic flux contact with pole-pieces 19 such that a magnetic circuit (represented by flux lines 23) is formed including magnet 22, pole-pieces 19, shaft 15, and annular gaps 20. Magnetic flux is concentrated in gaps 20, and ferrofluid is retained therein such that the plurality of gaps defines a plurality of separate ferrofluid O-ring seals about the surface of the shaft. Each ferrofluid seal has a defined pressure capacity. Thus, a series of pressure stages is formed between atmospheric or high-pressure region 16 and high-vacuum region 14.

In this embodiment, vacuum chamber 14 is subject to bursting from seals in gaps 20 and outgassing from bearing 18. Continuous pumping with mechanical or diffusion pump 24 is thus necessary to maintain a sufficient vacuum in chamber 14. FIG. 1 also shows machined region or pulley 36, adapted to receive a belt to drive shaft 15, and rotary water union 42 for circulating water or other coolant through shaft 15.

Figure 2A:
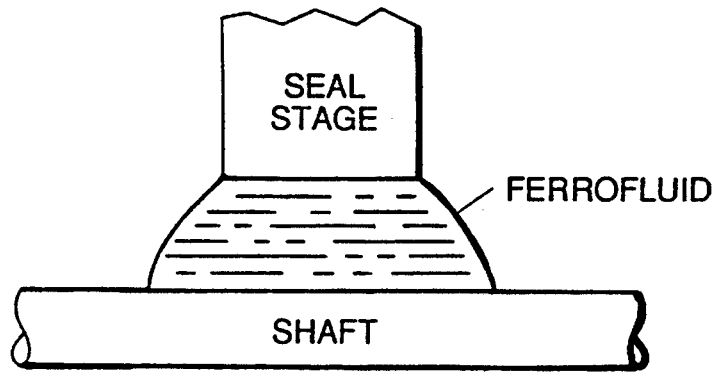
FIGS. 2A, 2B, and 2C illustrate the known effects of exposure of a single-stage ferrofluidic seal to a range of pressure differentials.
Figure 2B:
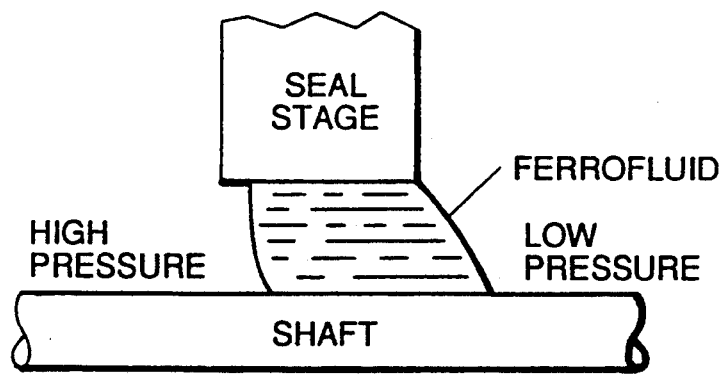
Figure 2C:
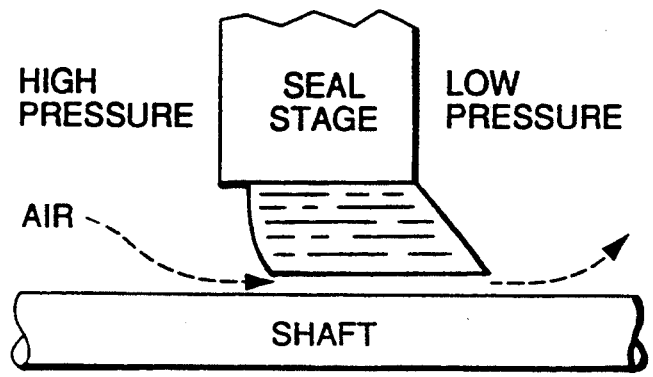

FIG. 2 illustrates the above-noted bursting of ferrofluidic seals. FIG. 2(a) represents the fluid shape of a ferrofluid seal under a single-stage pole-piece or one stage of a multi-stage pole--piece when the pressure on each side of the stage of the seal is the same or approximately the same. FIG. 2(b) illustrates a single-stage ferrofluid seal at the point of maximum pressure capacity of the seal, when there exists a high-pressure environment on one side of the seal and a low-pressure environment on the other side. FIG. 2(c) illustrates a single-stage seal at the point at which maximum pressure capacity has been exceeded and "bursting" has occurred, that is, a small quantity of air or other gas has moved from the high-pressure side to the low-pressure side of the seal. Such bursting diminishes the effectiveness of the ferrofluid seal.

Figure 3:
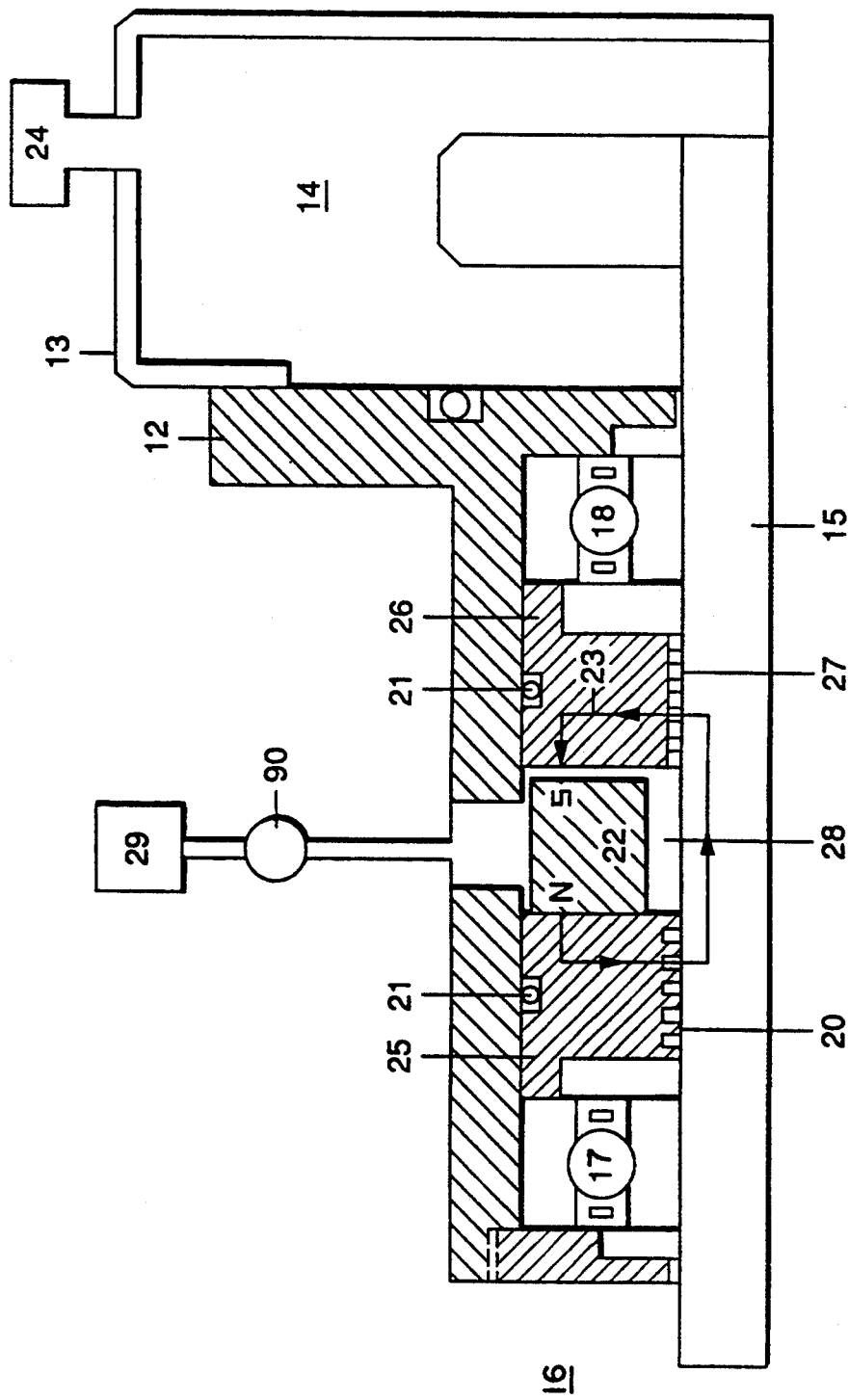
FIG. 3 is a cross-sectional view of a prior art ferrofluidic seal in operation about a rotating shaft illustrating an intermediate, differentially-pumped region between the first, multi-stage seal and the second, single-stage seal. As a convenience for illustration, the prior art seal is shown as it would be used in a rotating x-ray anode application.

FIG. 3 illustrates a prior art ferrofluid seal apparatus designed to correct the above-noted bursting problem. In this embodiment, a magnetic circuit represented by flux lines 23 includes magnet 22, pole-pieces 25 and 26, shaft 15, plurality of annular gaps 20 and singular annular gap 27. A first, multi-stage seal is defined by the plurality of annular gaps 20 formed by the proximity of ridges on pole-piece 25 to shaft 15, which gaps contain ferrofluid retained therein by magnetic flux. This multi-stage seal is designed and constructed to have sufficient pressure capacity to withstand the entire pressure drop between atmospheric or high-pressure region 16 and high-vacuum 14. A second, single-stage ferrofluid seal is defined by annular gap 27 formed by the proximity of single-stage pole-piece 26 to shaft 15, which gap includes ferrofluid retained therein by magnetic flux. This second single-stage seal has a low pressure resistance. In this embodiment enclosed, annular interstage volume 28 between pole-pieces 25 and 26 is evacuated by apparatus 29, generally a mechanical vacuum pump, to a pressure between atmospheric or high pressure 16 and high vacuum 14, but substantially similar to high vacuum 14. The proper pressure in volume 28 is maintained by gauge 90, which can be adapted to control pumping apparatus 29. Thus, the pressure differential across the second, single-stage seal at gap 27 is small, the possibility of bursting of the second, single-stage seal is ideally eliminated, and high-vacuum 14 is more effectively maintained. Bursting occurs in first, multi-stage seal defined by annular gaps 20, but harmlessly affects interstage volume 28 evacuated by apparatus 29. In this arrangement bearings 17 and 18 support shaft 15 relatively at its ends in a mechanically stable arrangement, but bearing 18 is exposed to high-vacuum environment 14 and outgasses thereinto. Thus, high vacuum 14 is slightly contaminated by bearing outgassing, and must be addressed by continuous pumping at pump 24.

Figure 4:
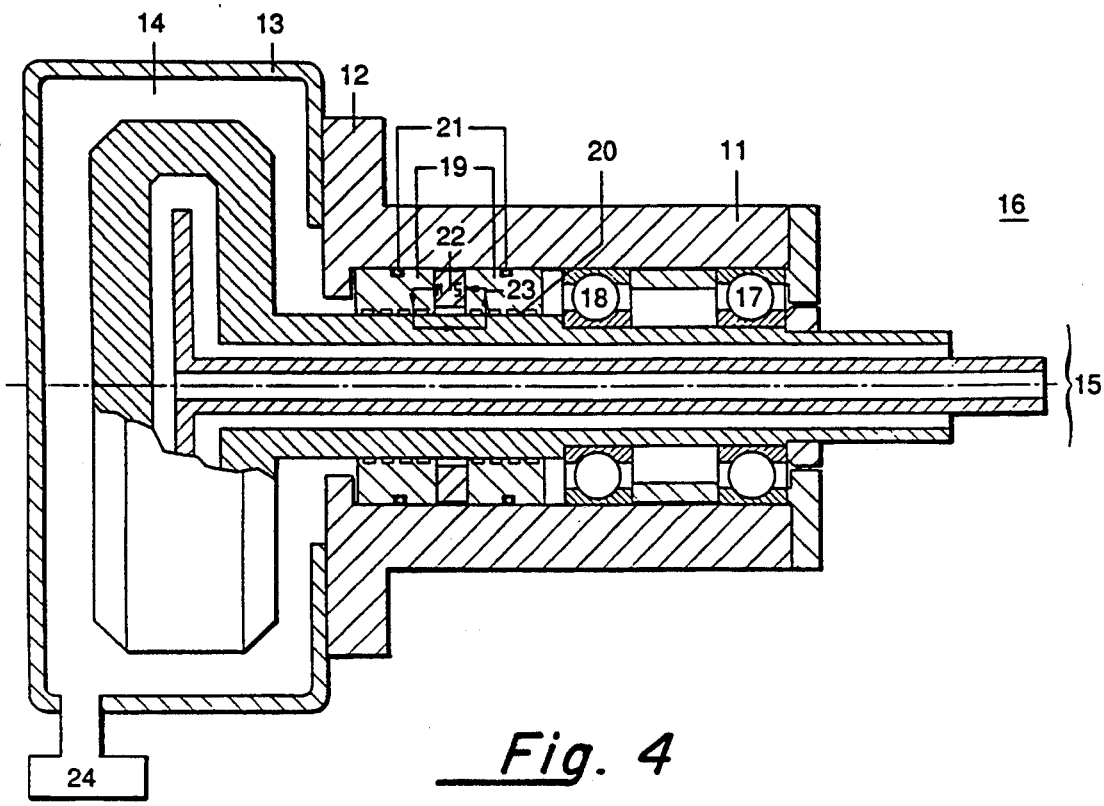
FIG. 4 is a cross-sectional view of a prior art ferrofluidic seal in operation about a rotating shaft in which a multi-stage seal is placed on the shaft between the bearings and the high-vacuum region to eliminate bearing outgassing thereinto, necessitating a cantilevered shaft-/bearing arrangement. As a convenience for illustration, the prior art seal is shown as it would be used in a rotating x-ray anode application.

FIG. 4 illustrates a prior art multiple-stage ferrofluid seal apparatus which eliminates the problem of bearing outgassing into a high-vacuum region. In this embodiment, a conventional multi-stage ferrofluid seal including pole pieces 19, shaft 15, and magnet 22 is disposed on shaft 15 on the high-vacuum side relative to bearings 17 and 18. Bearings 17 and 18 are effectively sealed from high-vacuum environment 14 and no bearing outgassing into environment 14 occurs. However, bursting of the conventional multi-stage seal occurs, and high-vacuum 14 must be continually evacuated at pump 24. In addition, due to this "cantilevered" arrangement, that is, the relatively long shaft overhang from bearing 18 to the end of the shaft in high-vacuum environment 14, the shaft is relatively unstable mechanically and excessive vibration at high shaft rotation speeds results.

Figure 5:
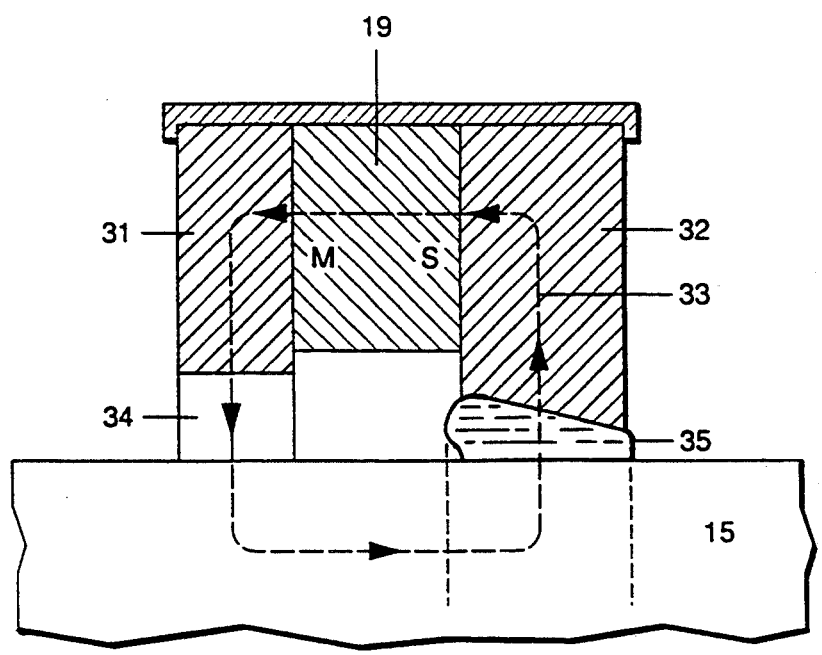
FIG. 5 is a cross-sectional view of a prior art tapered, single-stage ferrofluidic seal in operation about a rotating shaft.

FIG. 5 illustrates a cross-sectional view of a prior art tapered, single-stage ferrofluidic seal, comprising magnet 91 and pole pieces 31 and 32 on either side of the magnet and disposed about shaft 15 to form a magnetic circuit represented by flux line 33. Upon initial set-up, ferrofluid is present both in gaps 34 and 35, but upon high speed shaft rotation, ferrofluid in gap 34 becomes hot enough to evaporate as pole piece 31 is substantially narrower than is pole piece 32 and does not dissipate heat from the seal nearly as efficiently. Thus, after a short set-up period of operation, ferrofluid in gap 34 evaporates while ferrofluid in gap 35 remains, resulting in a single-stage seal. The taper of pole piece 32 allows gap 35 to retain a greater volume of ferrofluid than would exist in a non-tapered pole--piece, while allowing the advantage of close proximity with shaft 15 at the most proximate point of pole-piece 32. The result is-an excess of ferrofluid which acts as a reservoir, countering the effects of evaporation and extending seal life.

Figure 6:
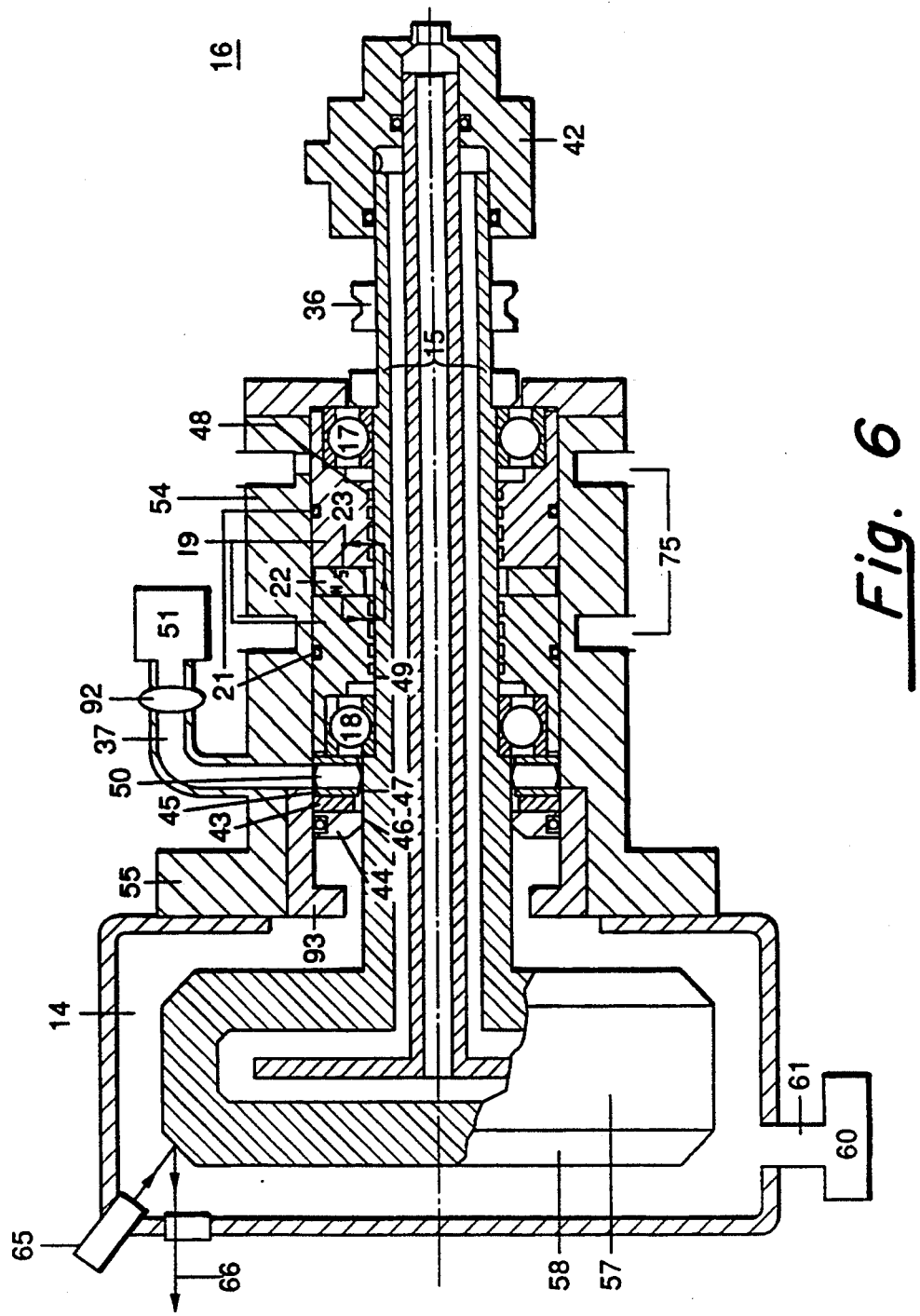
FIG. 6 is a cross-sectional view of a differentially-pumped, non--bursting ferrofluidic seal in operation about a rotating shaft according to one embodiment of the present invention.

FIG. 6 illustrates one embodiment of a non-bursting, non-outgassing, mechanically--stable, multi--stage ferrofluid seal arrangement for use at high shaft rotation speed and comprising minimal weight, according to the present invention. In FIG. 6 is illustrated an embodiment for generation of high-density x-rays in a CAT Scan apparatus or the like, including electron gun 65 which fires upon anode 58, generating x-rays 66.

In this embodiment, a first multi-stage ferrofluid rotary seal comprising magnet 22, pole-pieces 19, magnetically-permeable shaft 15, and annular gaps 48 between ridges 49 on pole-pieces 19 and shaft 15, surrounds shaft 15. The multi-stage seal is designed and constructed to have sufficient pressure capacity to withstand the entire pressure drop between an environment at a first pressure such as atmospheric or high-pressure region 16 and an environment at a second pressure such as high-vacuum 14. Ridges 49 preferably extend from about 0.010 to about 0.040 inches from pole-pieces 19 and from about 0.018 to about 0.022 inches in the preferred embodiment. Ridges 49 are preferably from about 0.006 to about 0.015 inches wide, and from about 0.008 to about 0.010 inches wide in the preferred embodiment. Pole-pieces 19 preferably each have from about 10 to about 30 ridges defining from 10 to 30 ferrofluid stages each, and have from about 17 to about 23 stages each in the preferred embodiment. The clearance between ridges 49 and shaft 15, defining annular gaps 48, is preferably from about 0.001 to about 0.008 inches, and more preferably from about 0.002 to about 0.004 inches. It is to be understood that an embodiment in which ridges and grooves in shaft 15, rather than in pole pieces 19, may form annular gaps 48 in the multi-stage seal A second, single-stage ferrofluid seal including magnet 43, pole-pieces 44 and 45, magnetically-permeable shaft 15, and annular gaps 46 and 47, surrounds shaft 15 on the high-vacuum side of the first, multi--stage seal. In the preferred embodiment, pole-piece 44 is wider than and is placed in closer proximity to shaft 15 than is pole-piece 45. Thus, ferrofluid is retained selectively in annular gap 46, creating the single-stage seal as in the seal discussed with respect to FIG. 5. Annular gap 46 between pole-piece 44 and shaft 15 is from about 0.001 to about 0.01 inches wide, and preferably from about 0.002 to about 0.006 inches wide. Annular gap 47 between pole-piece 45 and shaft 15 is from about 0.003 to about 0.020 inches wide and preferably from about 0.004 to 0.008 inches wide. Pole-piece 44 can be flat or tapered, and in a preferred embodiment is tapered to form an annular wedge-shaped gap having a sloping wall extending radially toward the axis of the shaft, resulting in longer seal life. The above-described dimensions of annular gap 46 refer to the portion of pole piece 44 which is closest to shaft 15, in the embodiment in which pole piece 44 is tapered. In an alternate embodiment pole-pieces 44 and 45 are reversed, that is, the single-stage seal can be formed at the pole piece on either side of magnet 43. In an alternate embodiment, a portion of shaft 15 most proximate to pole piece 44 can be tapered, rather than pole piece 44 itself. It is also to be understood that the single-stage seal can comprise a magnet, a shaft, and a single pole piece rather than two pole pieces.

Between the first multi-stage seal and the second single-stage seal is annular, enclosed interstage region 50 evacuated to a pressure between that of atmosphere or high-pressure 16 and high-vacuum 14. Region 50 is advantageously maintained at a pressure between atmosphere (or high-pressure) and high vacuum, generally at a slight pressure, or a vacuum slightly less than the high vacuum. Thus, region 50 is ideally maintained at a pressure (vacuum) such that the pressure differential across the second single-stage seal does not exceed its pressure capacity, and as a result bursting of the single-stage seal does not occur. This pressure differential is preferably less than 250 TORR and more preferably less than 100 TORR. Port 37 is connected to region 50 to maintain the desired pressure (vacuum) therein, and pumping mechanism 51 connected to port 37 creates and/or maintains such vacuum. Mechanism 51 can comprise a mechanical vacuum pump or the like, and in the preferred embodiment comprises a light-weight vacuum ballast tank which can periodically be evacuated by mechanical means. A gauge 92 can be disposed between port 37 and pumping mechanism 51, and can be adapted to control mechanical pump 51 or, in the preferred embodiment, to measure and display the pressure in light-weight ballast 51. Gauge 92 may alternately be disposed on ballast 51 in an alternate embodiment.

Shaft 15 is supported relatively at its ends by a mechanically-stable bearing arrangement including bearings 17 and 18. Bearing 18 is isolated in the present embodiment from high-vacuum region 14 by the second, single-stage seal, and thus any outgassing of bearing 18 affects only interstage region 50, not high-vacuum region 14. Region 50, during operation, is subject only to bursting from the first multi-stage seal and outgassing of bearing 18, and can easily be maintained at the desired vacuum by periodic evacuation of the light-weight ballast tank 51. Bearings 17 and 18 can comprise magnetically-permeable bearings or non-magnetically permeable bearings. If magnetically permeable bearings are used, a magnetic insulator (not shown) is advantageously placed between the bearings and the pole-pieces to isolate them from the magnetic circuit.

Thus, it is an advantage of the invention that high-vacuum region 14 is not subject to any seal bursting or bearing outgassing, but only to outgassing of solid materials which make up the vacuum chamber, such as glass and steel. Therefore, region 14 need not be addressed by continuous pumping by mechanical or diffusion pumping, and the high vacuum can be easily maintained using light-weight means such as ion pump 60, addressing port 61 of high-vacuum region 14. Ion pumps are well-known and are commercially available from Varian, of Palo Alto, Calif. and from Thermionics, of Santa Clara, Calif. In the preferred embodiment, high-vacuum region 14 is kept at a pressure of $1 \times 10^{-6}$ TORR or less by ion pump 60, while atmosphere or high-pressure region 16 represents a pressure of 1 to 5 atmospheres. During initial set-up, region 14 is evacuated to high vacuum by conventional means such as mechanical pumping and diffusion pumping through port 61.

Shaft 15 can be solid or hollow, and is hollow in the preferred embodiment so that coolant such as water, ethylene glycol or the like can be circulated through the shaft by rotary water union 42. Shaft 15 can be manufactured from martinsitic stainless steel or other magnetic alloy, and is manufactured from 416 stainless steel alloy in the preferred embodiment. Shaft 15 terminates in the high-vacuum region 14 with mounting plate 57 onto which rotatable anode 58 or the like can be mounted. At its other, high-pressure or atmosphere end, shaft 15 contains machined region or pulley 36 for receiving a drive belt.

Housing 54 including mounting flange 55 can be manufactured from austinitic stainless steel, aluminum, or other non-magnetic material. In the preferred embodiment, housing 54 is manufactured from stainless steel. Housing 54 includes cooling channels 75 through which coolant such as water, ethylene glycol or the like is circulated to receive heat generated at annular gaps 48 and at bearings 17 and 18 during the high-speed rotation, and heat generated at anode 58 via mounting plate 57, shaft 15, and gaps 48. Similar cooling channels may be included in housing 54 in the proximity of the second, single-stage seal. In the preferred embodiment, however, the single-stage seal and surrounding housing 54 is massive enough as a whole to receive and dissipate heat from the seal at gap 46 efficiently. Also included in housing 54 is removable region 93, such that the single stage seal, bearing 18, and interstage region 50 can be easily serviced if necessary.

Ferrofluids used in ferrofluidic seals of this type are known in the art and described in U.S. Pat. No. 3,917,538, issued Nov. 4, 1975 and U.S. Pat. No. 4,356,098, issued Oct. 26, 1982. Any of several ferrofluids commercially available from Ferrofluidics Corporation of Nashua, N.H. can be used in the preferred embodiment of the present invention. The most preferred ferrofluid in the present embodiment is commercially available as part no. VSG-803 from Ferrofluidics Corporation.

Figure 7:
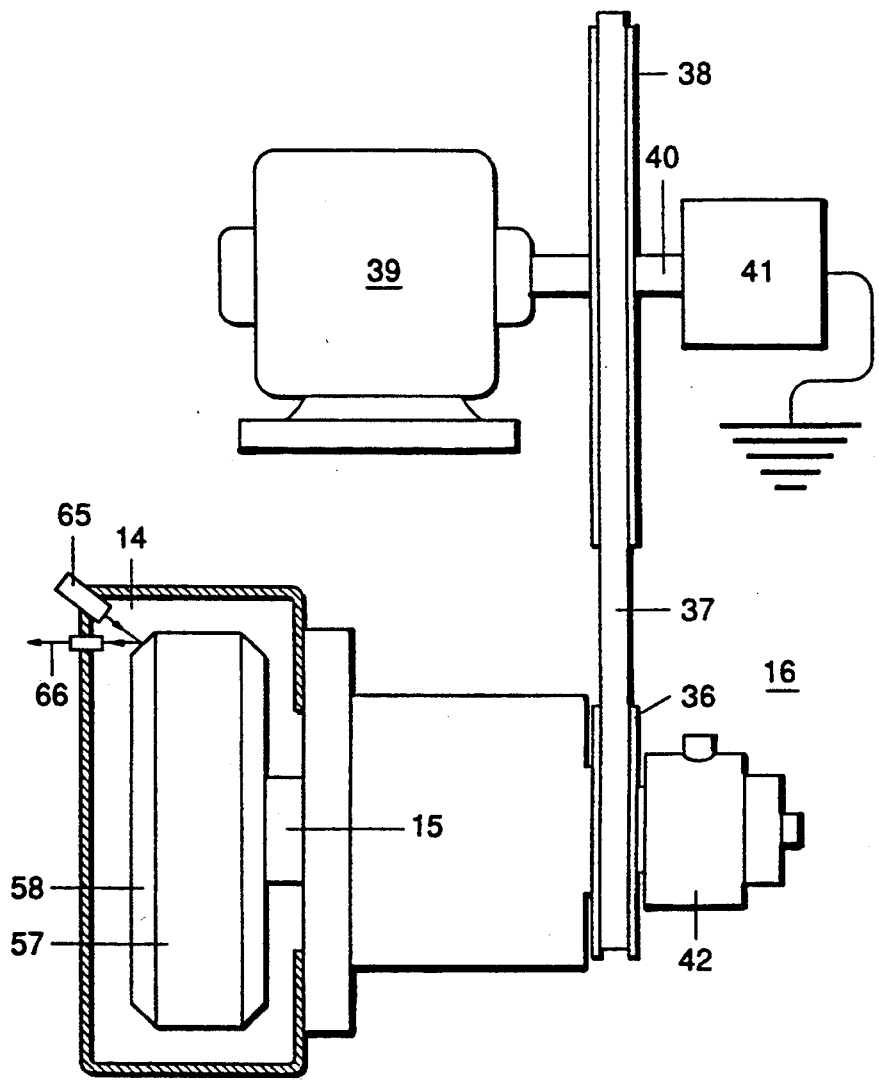
FIG. 7 illustrates one embodiment of the electrical grounding arrangement of a high-speed shaft according to the present invention.

FIG. 7 illustrates a system according to one embodiment of the present invention for establishing electrical contact between a rotatable conductor, such as anode 58 mounted on plate 57 of high-speed rotary shaft 15, and ground. In this embodiment shaft 15 serves as an intermediate electrically conductive means which extends outside of high-vacuum environment 14 and into atmosphere or high-pressure environment 16. Shaft 15 contains region 36 machined to receive electrically-conductive belt 37. In an alternate embodiment, a pulley 36 receives electrically-conductive belt 37. During operation, as belt 37 passes around pulley or machined region 36, a portion of belt 37 is in continuous and static contact with region 36. Electrical contact is efficiently made as no sliding of conductors relative to each other occurs, as occurs in grounding with conventional brushes. Belt 37 is engaged by electrically-conductive pulley 38 driven by motor 39 and second electrically-conductive shaft 40, and is also in continuous and static electrical contact with pulley 38. Shaft 40 is grounded by conventional grounding means 41 such as mercury slip rings, graphite brushes, or gold foil brushes. In a preferred embodiment, pulley 38 has a radius greater than machined region or pulley 36, thus shaft 15 rotates at a speed greater than shaft 40 as the motor is driven. At the desired speed of rotation of shaft 15 according to the present invention (from about 6,000 to about 12,000 RPM), grounding by conventional means is not feasible, but the arrangement transfers charge to shaft 40 rotating at from about 1000 to about 4000 RPM, and from about 2000 to about 3000 in the preferred embodiment, where grounding by conventional means is feasible.

Grounding is also undesirable in the immediate vicinity of bearings or in a region such as high-vacuum region 14, as conventional brushes emit particulate matter during operation which destroys bearings and contaminates vacuum environments. Thus, the present invention advantageously effects grounding at a location remote from bearings supporting shaft 15, and remote from high-vacuum 14.

As noted, grounding means 41 can comprise any conventional grounding brushes or the like, and in the preferred embodiment, a mercury slip ring assembly is used which can efficiently ground a shaft rotating at up to 3000 RPM. Such slip rings are known in the art and are commercially available from Wendon Company, Inc., of Stamford, Conn. Electrically conductive belts are known in the art and are available from Advanced Belt Technology of Middletown, Conn. Motor 39 can comprise any conventional drive motor. Such motors are readily commercially available from, for example, General Electric Company.

Also illustrated in FIG. 7 is rotary water union 42 for circulating coolant through hollow shaft 15 to remove heat generated by at the anode and in the high-speed rotation of the shaft. Rotary water unions are known in the art and are commercially available from Duff-Norton of Charlotte, N.C.

Thus, FIG. 7 illustrates an arrangement whereby high speed shaft 15 is cooled according to the prior art, and is grounded by an embodiment of the present invention.

Those skilled in the art will readily appreciate that all parameters listed herein are meant to be exemplary and actual parameters will depend on the specific application for which the sealing and grounding arrangements are being used. It is, therefore, to be understood that the foregoing embodiments are presented by way of example only and that, within the scope of the appended claims and equivalents thereto, the invention may be practiced otherwise than as specifically described.

What is claimed is:

1. Ferrofluid seal apparatus for forming a seal between a housing and a shaft passing between a first environment at a first pressure and a second environment at a second pressure less than the first pressure by a pressure difference, the apparatus comprising:

a first ferrofluid seal comprising magnetic means with contiguous pole piece means for forming a seal on the shaft between the shaft and the housing to separate the first environment from the second environment, the first ferrofluid seal being designed and constructed to have sufficient pressure capacity to withstand the pressure difference;

a second ferrofluid seal comprising magnetic means with contiguous pole piece means for forming a seal on the shaft between the shaft and the housing, the second ferrofluid seal being located between the first ferrofluid seal and the second environment and being designed and constructed to minimize bursting of the second ferrofluid seal;

means for maintaining an interstage region bounded by the shaft, the housing and the first and second ferrofluid seals at a pressure near, but greater than the second pressure, and at least one bearing supporting the shaft in the housing, the bearing being located in the interstage region.

2. Ferrofluid seal apparatus as claimed in claim 1, the apparatus further comprising:

at least one second bearing supporting the shaft in the housing, the second bearing being located in the first environment.

3. Ferrofluid seal apparatus as claimed in claim 1, wherein the first ferrofluid seal comprises a multiple-stage seal; and the second ferrofluid seal comprises a single-stage seal.

4. Ferrofluid seal apparatus for use in an X-ray scanning device having a housing with an interior and a wall, a rotating anode enclosed by the housing and attached to a shaft passing through the wall, and a vacuum pump for evacuating the housing interior to a high vacuum, the apparatus comprising:

a first ferrofluid seal comprising magnetic means with contiguous pole piece means for forming a hermetic seal between the shaft and the housing wall and comprising at least one stage, the first seal having a first side and a high vacuum side and being designed and constructed to have sufficient pressure capacity to maintain the high vacuum in the housing interior;

a bearing located on the high vacuum side of the first seal and supporting the shaft in the housing;

a second ferrofluid seal comprising magnetic means with contiguous pole piece means for forming a seal between the shaft and the housing wall, the second ferrofluid seal isolating the bearing from the high vacuum in the housing interior and being designed and constructed to minimize bursting of the second ferrofluid seal; and means for maintaining an interstage region bounded by the shaft, the housing wall and the first and the second seals at a vacuum near, but less than the high vacuum.

5. Ferrofluid seal apparatus as claimed in claim 4, the apparatus further comprising:

a second bearing located on the first side of the first seal and supporting the shaft in the housing.

6. Ferrofluid seal apparatus as claimed in claim 4, wherein the first ferrofluid seal comprises a multiple-stage seal; and the second ferrofluid seal comprises a single-stage seal.

7. Ferrofluid seal apparatus as claimed in claim 4, wherein the shaft comprises at least one cavity, and the apparatus further comprises means for circulating coolant through the cavity to cool the anode and the shaft.

8. Ferrofluid seal apparatus as claimed in claim 4, wherein the second ferrofluid seal comprises a magnetically permeable pole piece in close proximity to and in magnetic flux relationship with the shaft, the pole piece being shaped to form a tapered gap between the pole piece and the shaft having a sloping wall which extends radially towards the axis of the shaft.

9. Ferrofluid seal apparatus as claimed in claim 4, wherein the first ferrofluid seal is designed and constructed to have sufficient pressure capacity to withstand a pressure of from about 1 to about 5 atmospheres; and the second ferrofluid seal is designed and constructed to have sufficient pressure capacity to withstand a pressure difference of up to 250 TORR.

10. Ferrofluid seal apparatus as claimed in claim 4, wherein the shaft is electrically conductive, and the apparatus further comprises:

an electrically conductive, flexible belt engaging the shaft;

a second electrically conductive shaft engaged by the flexible belt; and grounding means contacting the second shaft, such that the first shaft is grounded.

11. Ferrofluid seal apparatus for use in an X-ray scanning device having a housing with an interior and a wall, a rotating anode enclosed by the housing, and a vacuum pump for evacuating the housing interior to a high vacuum, the apparatus comprising:

a magnetically permeable shaft attached to the anode, supported by a plurality of bearings and passing through the wall between a first environment at a first pressure greater than the high vacuum by a pressure difference and the housing interior;

a first, multiple-stage ferrofluid rotary seal comprising magnetic means with contiguous pole piece means located between the housing and the shaft and having a first pressure side and a high vacuum side, the first ferrofluid seal being designed and constructed to have sufficient pressure capacity to withstand the pressure difference;

a first bearing located on the first pressure side of the first ferrofluid seal for supporting the shaft in the housing;

a second bearing located on the high vacuum side of the first ferrofluid seal for supporting the shaft in the housing and having a high vacuum side;

a second, single-stage ferrofluid rotary seal comprising magnetic means with contiguous pole piece means on the shaft in series with the first seal and on the high vacuum side of the second bearing, the second ferrofluid seal isolating the bearing from the high vacuum in the interior of the housing and being designed and constructed to minimize bursting of the second ferrofluid seal; and means for maintaining an interstage region bounded by the shaft, the housing wall and the first and second seals at a vacuum near, but less than the high vacuum.

12. Ferrofluid seal apparatus as claimed in claim 11, wherein the first ferrofluid seal includes at least one pole piece having a series of ridges and grooves therein, which ridges are in close proximity with the shaft and form a series of ferrofluid seal stages.

13. Ferrofluid seal apparatus as claimed in claim 11, wherein the first ferrofluid seal includes a series of ridges and grooves in the shaft, which ridges are in close proximity with at least one pole piece and form a series of ferrofluid seal stages.

14. Ferrofluid seal apparatus as claimed in claim 11, wherein the second ferrofluid seal comprises a magnetically permeable pole piece in close proximity with and in magnetic flux relationship with the shaft, the pole piece being shaped to form a tapered gap between the pole piece and the shaft having a sloping wall which extends radially towards the axis of the shaft.

15. Ferrofluid seal apparatus as claimed in claim 11, wherein the shaft comprises at least one cavity, and the apparatus further comprises means for circulating coolant through the cavity to cool the anode and shaft.

16. Ferrofluid seal apparatus as claimed in claim 11, wherein the shaft is electrically conductive, and the apparatus further comprises:

an electrically conductive, flexible belt engaging the shaft;

a second electrically conductive shaft engaged by the flexible belt; and grounding means contacting the second shaft, such that the first shaft is grounded.

17. Ferrofluid seal apparatus as claimed in claim 11, wherein the first ferrofluid seal is designed and constructed to have sufficient pressure capacity to withstand a pressure of from about 1 to about 5 atmospheres; and the second ferrofluid seal is designed and constructed to have sufficient pressure capacity to withstand a pressure of up to 250 TORR.

18. Ferrofluid seal apparatus as claimed in claim 11, wherein said means for maintaining an interstage region at a vacuum near, but less than the high vacuum comprise a ballast tank connected to the interstage region, which tank further comprises a port for evacuating the tank and a gauge for displaying a pressure in the tank.

19. A high speed rotary device for supporting a high speed rotary anode, which anode is exposed to an electron beam and accumulates electric charge and heat from the electron beam, for X-ray generation in a CAT Scan apparatus or the like, and comprising:

a magnetically-permeable electrically-conductive shaft passing between a first environment at a first pressure and a second environment at high vacuum and supporting the anode in the second environment, which shaft is rotatable and generates heat, a housing surrounding a portion of the shaft, first bearing means having a first pressure side and a high vacuum side disposed within the housing and supporting the shaft, a first multiple-stage ferrofluid rotary seal comprising magnetic means with contiguous pole piece means having a first pressure side and a high vacuum side on the shaft and on the high-vacuum side of the first bearing means, the first ferrofluid seal being designed and constructed to have sufficient pressure capacity to withstand the entire pressure drop between the first pressure and the high vacuum, second bearing means having a first pressure side and a high-vacuum side further supporting the shaft and on the high-vacuum side of the first rotary seal, a second ferrofluid rotary seal comprising magnetic means with contiguous pole piece means on the shaft in series with the first seal and on the high-vacuum side of the second bearing means, the second ferrofluid seal being a single-stage seal with a construction that has a low pressure resistance but that minimizes the possibility of bursting of the second ferrofluid seal, means for defining an enclosed interstage volume between the first and second seals, and a port for allowing the interstage volume to be evacuated to a pressure between the first pressure and the high vacuum, means for dissipating heat from the shaft and the rotary anode, and means for grounding the rotary anode in the environment at the first pressure.

20. A system for establishing electrical contact between a first rotatable electrical conductor in a first environment and grounded means, the system comprising:

first intermediate electrically conductive means in continuous and static contact with the first rotatable conductor, and comprising at least one rotating portion extending outside of the first environment into a second environment;

an intermediate electrically conductive belt means in continuous and static contact with the first intermediate means portion in the second environment; and a second rotatable electrical conductor in continuous and static contact with the intermediate conductive belt, and in continuous contact with the grounded means, such that said first rotatable conductor is effectively grounded.

21. A system as claimed in claim 20, wherein the first intermediate means comprises a first electrically conductive shaft, the at least one portion extending into the second environment adapted to receive a drive belt;

the intermediate electrically conductive belt means comprises a flexible, electrically conductive belt engaging the first shaft;

the second rotatable conductor comprises a second electrically conductive shaft adapted to receive and engaged by the electrically conductive belt; and the grounding means comprise mechanical means for electrically grounding the second electrically conductive shaft.

22. A system as claimed in claim 21, wherein the mechanical grounding means are selected from the group consisting of: mercury slip rings, graphite brushes and gold foil brushes.

23. A system for establishing electrical contact between a first electrical conductor rotatable means at a first speed and grounded means, the system comprising:

first intermediate electrically conductive means in continuous and static contact with the first rotatable conductor;

an intermediate electrically conductive belt in continuous and static contact with the first intermediate means; and a second electrical conductor rotatable at a second speed which is slower than the first speed and in continuous and static contact with the second intermediate conductive belt, and in continuous contact with the grounded means, such that said first rotatable conductor is effectively grounded.

24. A system as claimed in claim 23, wherein the first intermediate means comprises a first electrically conductive shaft adapted to receive a drive belt;

the second intermediate means comprises a flexible, electrically conductive belt engaging the first shaft;

the second rotatable conductive comprises a second electrically conductive shaft adapted to receive and to be engaged by the electrically conductive belt; and the grounded means comprise mechanical means for electrically grounding the second electrically conductive shaft.

25. A system as claimed in claim 24, wherein the mechanical grounded means are selected from the group consisting of: mercury slip rings, graphite brushes and gold foil brushes.

26. A grounding arrangement for use with a first rotatable electrical conductor in a first environment mounted on a first electrically conductive shaft having a first radius and passing between the first environment at a first pressure and a second environment at a second pressure, which shaft is rotatable at a first speed, the apparatus comprising:

an electrically conductive, flexible belt engaging the first shaft in the second environment, a second electrically conductive shaft in the second environment and engaged by the flexible belt, which second shaft has a second radius greater than that of the first radius such that the second shaft is rotatable at a second speed less than the first speed, and grounding means contacting the second shaft, such that the first shaft is grounded.

* * * * *